(12) United States Patent  
Hyatt et al.

(10) Patent No.: US 9,422,821 B2
(45) Date of Patent: Aug. 23, 2016

(54) SELECTIVE COATING REMOVAL OR MASKING FOR GROUND PATH

(71) Applicant: United Technologies Corporation, Hartford, CT (US)

(72) Inventors: Thomas B. Hyatt, Cromwell, CT (US); Carl Brian Klinetob, East Haddam, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 14/776,341

(22) PCT Filed: Mar. 14, 2014

(86) PCT No.: PCT/US2014/027557
§ 371 (c)(1),
(2) Date: Sep. 14, 2015

(87) PCT Pub. No.: WO2014/152636
PCT Pub. Date: Sep. 25, 2014

(65) Prior Publication Data
US 2016/0032744 A1 Feb. 4, 2016

Related U.S. Application Data

(60) Provisional application No. 61/789,709, filed on Mar. 15, 2013.

(51) Int. Cl.
*F01D 9/04* (2006.01)
*F01D 5/28* (2006.01)
(Continued)

(52) U.S. Cl.
CPC ............... *F01D 9/042* (2013.01); *B64D 45/02* (2013.01); *F01D 5/288* (2013.01); *F01D 25/005* (2013.01);
(Continued)

(58) Field of Classification Search
CPC ..... F01D 25/005; F01D 25/243; F01D 9/042; F01D 5/288; B64D 45/02
USPC ............................. 415/161, 200, 209.2, 209.3
See application file for complete search history.

(56) References Cited

U.S. PATENT DOCUMENTS 3,755,713 A * 8/1973 Paszkowski .......... B29C 70/885
244/1 A
3,906,308 A * 9/1975 Amason ................. B64D 45/02
244/1 A
(Continued)

FOREIGN PATENT DOCUMENTS

EP 1598121 A2 11/2005
EP 2108787 A2 10/2009
(Continued)

OTHER PUBLICATIONS

Extended European Search Report for European Patent Application No. 14768728.9, dated Apr. 6, 2016, 8 pages.
(Continued)

*Primary Examiner* — Dwayne J White
*Assistant Examiner* — Su Htay
(74) *Attorney, Agent, or Firm* — Kinney & Lange, P.A.

(57) ABSTRACT

A device for providing a grounding path between an outer surface of a gas turbine aircraft engine and an inner surface of a gas turbine aircraft engine uses a structural guide vane (SGV) with a nonconductive coating on the surface. Bolts are put in bolt holes that have a bolt receiving cavity without the nonconductive coating. A washer and bolt are used so that attachment of the SGV to a surface provides a ground path from the SGV through the bolt, washer and nut for electrical engagement with a surface to which the bolt attaches the SGV.

18 Claims, 3 Drawing Sheets

(51) Int. Cl.
  *F01D 25/24* (2006.01)
  *B64D 45/02* (2006.01)
  *F01D 25/00* (2006.01)

(52) U.S. Cl.
  CPC ........ *F01D 25/243* (2013.01); *F05D 2220/327* (2013.01); *F05D 2260/31* (2013.01); *F05D 2300/17* (2013.01); *F05D 2300/173* (2013.01); *F05D 2300/174* (2013.01); *F05D 2300/50* (2013.01)

(56) References Cited

U.S. PATENT DOCUMENTS

| | | | | |
|---|---|---|---|---|
| 3,989,984 A | * | 11/1976 | Amason | ................ B29C 70/885 244/1 A |
| 5,304,981 A | * | 4/1994 | Leising | ................ F16H 59/105 200/61.88 |
| 5,486,096 A | | 1/1996 | Hertel et al. | |
| 5,698,316 A | * | 12/1997 | Kuras | ..................... B32B 3/266 244/1 A |
| 5,855,709 A | | 1/1999 | Bocoviz et al. | |
| 6,371,725 B1 | * | 4/2002 | Manteiga | .................. F01D 5/14 415/209.4 |
| 7,738,236 B2 | * | 6/2010 | Stein | ..................... B64D 45/02 361/117 |
| 2004/0033137 A1 | | 2/2004 | Glover et al. | |
| 2008/0159856 A1 | | 7/2008 | Moniz et al. | |
| 2010/0209235 A1 | * | 8/2010 | Shim | ...................... B23P 15/04 415/200 |
| 2011/0247203 A1 | * | 10/2011 | Lopez-Reina Torrijos | ................. B64D 37/32 29/729 |

FOREIGN PATENT DOCUMENTS

JP   H11241707 A   9/1999
NL   7900723 A   8/1980

OTHER PUBLICATIONS

International Search Report and Written Opinion from PCT Application Serial No. PCT/US2014/027557, dated Jul. 7, 2014, 10 pages.

\* cited by examiner

SELECTIVE COATING REMOVAL OR MASKING FOR GROUND PATH

BACKGROUND

In a gas turbine engine used for propulsion, a fan case and a smaller diameter compressor case cooperate to radially bound an annular fan duct. Structural guide vanes (SGVs) span across the fan duct to de-swirl working medium fluid such as air flowing there through. The outer and inner extremities of the vanes are connected to the fan and compressor cases respectively.

On occasion, an aircraft will have static build up as it travels through the air, since air does contain electrons. More importantly, aircraft are occasionally subjected to lightning strikes. In both instances, grounding of the fan case is highly desirable.

One of the functions of SGVs is to serve as an electrical path to ground. The SGVs are connected to the fan case and the compressor case. When both cases serve as electrical grounds, the SGVs ensure that the two grounds are in good electrical contact so that neither case has a higher electrical potential. At the same time, all the mating interfaces are coated with a non-conductive paint and/or primer in order to prevent electric current to contact any part of the gas turbine engine. Additional mounting or structural components have been required to be added in order to secure a separate ground strap to provide a path for electrical current to a ground from the fan case to the compressor case.

SUMMARY

The present invention provides for a ground strap without additional mounting components for structural guide vanes (SGV). Local coating removal or masking at the surface that will contact the washer under the head of the bolt ensures electrical contact with the washer and bolt. The nut (and washer) element in the bolted joint is in electrical contact with the mating flange. The bolt is in electrical contact with the nut. This effectively substitutes or supplements a ground strap for the SGVs without any additional mounting components from the fan case to the compressor case.

DETAILED DESCRIPTION

Figure 1:
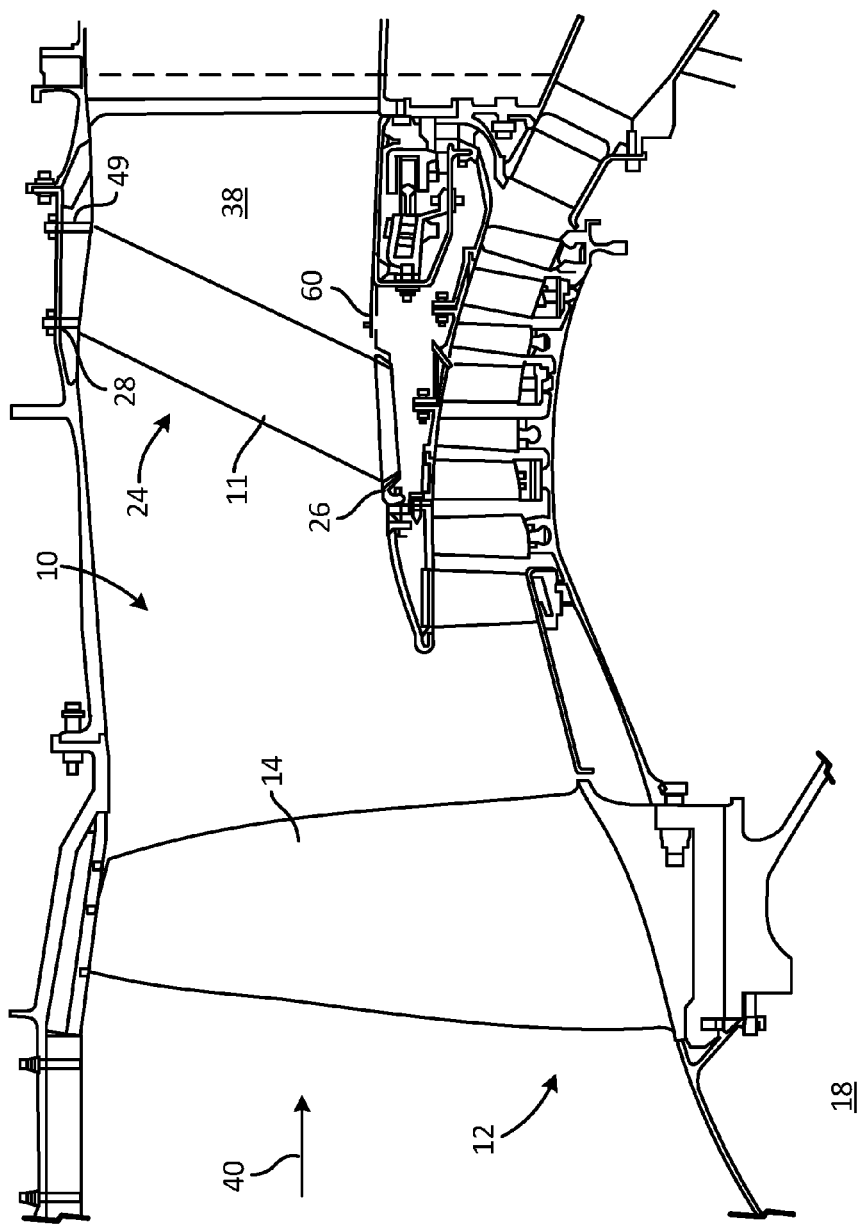
FIG. 1 is a cross-sectional view of an embodiment of a gas turbine engine.

Referring to FIG. 1, a gas turbine engine 10 of the type used for aircraft propulsion includes a fan section 12 having an array of fan blades such as representative blade 14 extending radially outward from hub 18. Hub 18 and blades 14 rotate about the engine axis. Fan section 12 also includes an array of fan exit guide vane assemblies, such as representative guide vane assembly 24, which extends radially between inner case 26 and outer case 28, both of which have a common axis with the engine axis. A fan flow path 38 extends through fan section 12 and a working medium fluid, such as air, flows through the flow path in the direction generally indicated by direction arrow 40.

The inner end of each fan exit guide vane 11 in the array of fan exit guide vanes is attached to an inner support structure such as annular ring 60 which forms part of inner case 26. The outer end of each fan exit guide vane 24 in the array of fan exit guide vanes is attached to outer case 28.

Figure 2A:
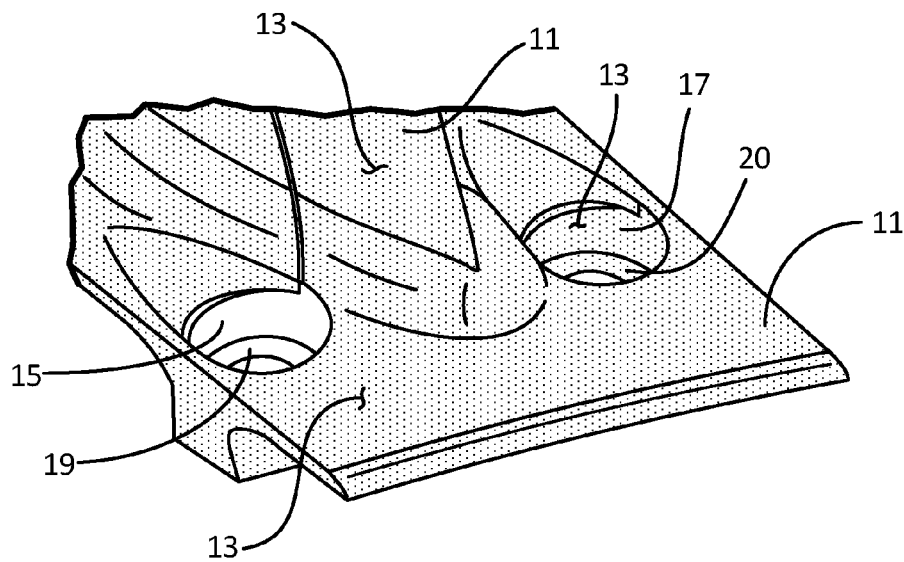
FIG. 2A, show perspective views of one end of the structural guide vane (SGV) with part of the non-conductive paint removed in one bolt hole.

FIG. 2A shows a forward edge of structural guide vane (SGV) 11, which has been coated with a nonconductive paint 13 such as epoxy and/or polyurethane. In one example, nonconductive paint can include polyurethane applied over a chromate epoxy layer. Making SGVs nonconductive is necessary to prevent galvanic action when different metals, such as alloys of aluminum, titanium and others are in mutual contact. At the same time, it is necessary to have a ground path through one or more of the SGVs to balance any stray electrical charges that have accumulated on the case(s) from various sources.

SGV 11 includes two bolt holes 15 and 17, through which a bolt is placed to mount SGV 11 so that it can extend between inner case 26 and outer case 28. In certain embodiments, inner case 26 and outer case 28 can be the same or different compositions as each other, such as one or more aluminum or titanium alloys. SGV 11 is shown in FIG. 2A at the (e.g., inner) end that mounts on compressor case 26. The other (e.g., outer) end mounts to fan case 28 in the same manner, and thus only the mounting of SGV 11 on compressor case 26 is shown for simplicity. Bolt hole 17 has coating 13 in the bolt receiving cavity 20 and bolt hole 15 has bolt receiving cavity 19 with no coating. Bolt receiving cavity 19 is uncoated, either by masking during coating or by removal after coating. In either case, unlike the rest of SGV 11, bolt receiving cavity 19 does not have a nonconductive coating, and thus is capable of conducting electricity. Here, only one bolt receiving cavity is uncoated at both ends of SGV 11 since one ground path is all that is needed.

Figure 2B:
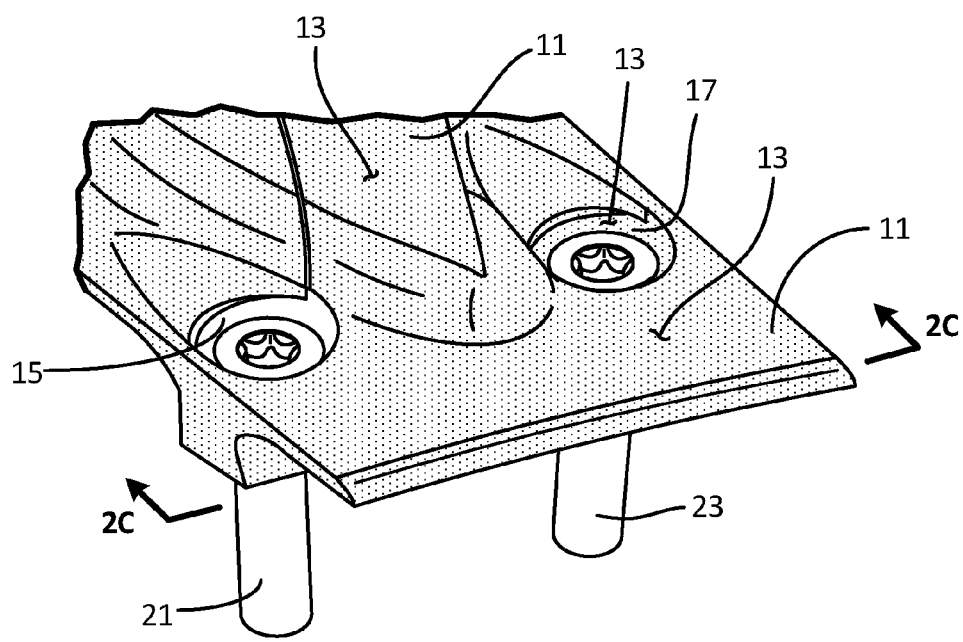
FIG. 2B shows a view of the SGV with bolts inserted.
Figure 2C:
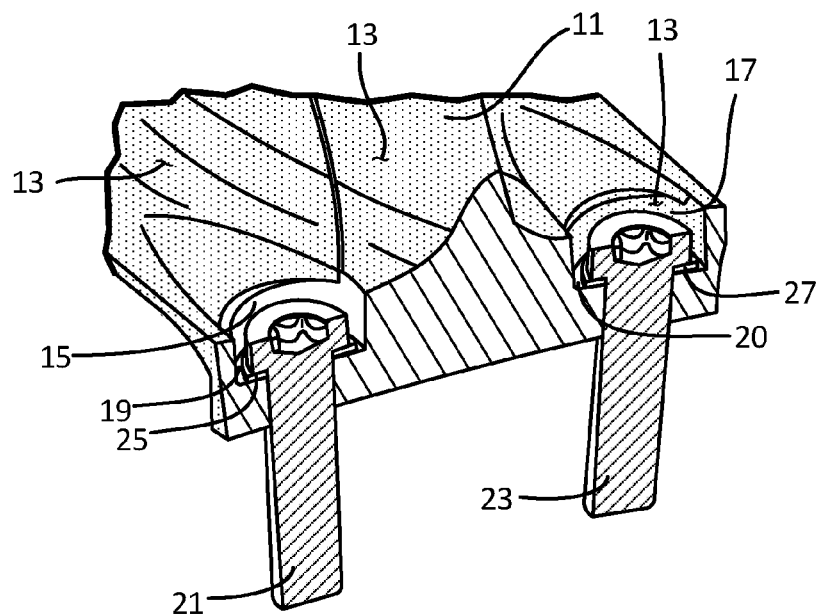
FIG. 2C shows a view of the SGV with a section taken along line 2C-2C of FIG. 2B through the SGV where bolts have been inserted in the bolt holes.

FIG. 2B shows SGV 11 with two bolts 21 and 23 inserted into bolt holes 15 and 17. FIG. 2C, taken as a section along line 2C-2C in FIG. 2B shows the bolts 21 and 23 inserted in their respective bolt holes 15 and 17 with washers 25 and 27. In bolt hole 15, washer 25 is in contact with bolt receiving cavity 19, thus establishing electrical contact. Washer 27 is in contact with bolt receiving cavity 20, which is coated and thus no electrical path is made. In both FIGS. 2B and 2C, the bolt receiving cavity is sized to support the bolt head on the washer so the top of the bolt head is at a point no higher than the surface of SGV 11.

Figure 3:
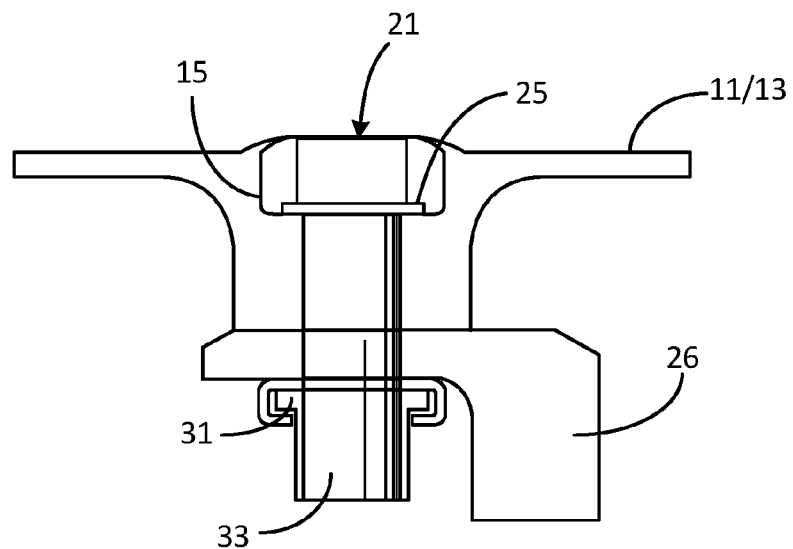
FIG. 3 is a section view of the SGV and bolts showing part of the electrical grounding path.

FIG. 3 shows a more complete section view of the present invention in which SGV 11 is attached to compressor case 26, taken from FIG. 1, where bolt 21 and washer 25 are held in place by nut 31 on compressor case 26, which has a conventional ground, not shown, using conductor body 33. In FIG. 3, the top of the bolt head is level with the surface of SGV 11.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

DISCUSSION OF POSSIBLE EMBODIMENTS

The following are nonexclusive descriptions of possible embodiments of the present invention.

A device for providing a grounding path between an outer surface of a gas turbine engine and an inner surface of the engine using a structural guide vane (SGV) with a nonconductive coating on the surface thereof for attachment to the outer surface and the inner surface, wherein at least one bolt hole on each end of the SGV is used for attachment to the outer surface and an the inner surface. The at least one bolt hole has a bolt receiving cavity without the nonconductive coating and a conductive washer for insertion in the bolt receiving cavity. A bolt is used for insertion into the bolt hole in contact with the conductive washer and a conductive nut is used for attachment to the bolt, such that attachment of the SGV to a surface provides a ground path from the SGV through the bolt, washer and nut for electrical engagement with a surface to which the bolt attaches the SGV.

The device of the preceding paragraph can optionally include additionally and/or alternatively, any one or more of the following features, configurations and/or additional components.

The device may be used with an outer fan case and an inner compressor case.

The two surfaces can be formed of different metal alloys.

The different metal alloys can include at least one of an aluminum alloy and a titanium alloy.

The nonconductive coating can comprise at least one of a polyurethane and an epoxy.

The bolt receiving cavity can be sized to support the bolt head on the washer such that the bolt head is no higher than the surface of the SGV.

A method of providing a grounding path between an outer surface of a gas turbine engine and an inner surface of the engine using a structural guide vane (SGV) with a nonconductive coating on the surface thereof for attachment to the outer surface and the inner surface, wherein at least one bolt hole on each end of the SGV is used for attachment to the outer surface and an the inner surface. The at least one bolt hole has a bolt receiving cavity without the nonconductive coating and a conductive washer for insertion in the bolt receiving cavity. A bolt is used for insertion into the bolt hole in contact with the conductive washer and a conductive nut is used for attachment to the bolt, such that attachment of the SGV to a surface provides a ground path from the SGV through the bolt, washer and nut for electrical engagement with a surface to which the bolt attaches the SGV.

The method of the preceding paragraph can optionally include additionally and/or alternatively, any one or more of the following features, configurations and/or additional components.

The method may be used with an outer fan case and a grounded inner compressor case.

The method can be used with two surfaces formed of different metal alloys.

The different metal alloys can include at least one of an aluminum alloy and a titanium alloy.

The nonconductive coating can comprise at least one of a polyurethane and an epoxy.

The bolt receiving cavity can be sized to support the bolt head on the washer such that the bolt head is no higher than the surface of the SGV.

In a gas turbine engine having an outer surface and an inner surface connected by at least one structural guide vane (SGV), an improvement in grounding can be accomplished by providing at least one structural guide vane (SGV) with a nonconductive coating on the surface thereof for attachment to the outer surface and the inner surface. At least one bolt hole is made on each end of the SGV for attachment to the outer surface and at the inner surface. The bolt hole has a bolt receiving cavity without the nonconductive coating so that it is conductive. A conductive washer is inserted in the bolt receiving cavity. When the bolt is inserted into the bolt hole, the bolt is in contact with the conductive washer. A conductive nut is threaded onto the bolt, such that attachment of the SGV to a surface provides a ground path from the SGV through the bolt, washer and nut for electrical engagement with a surface to which the bolt attaches the SGV.

The improvement of the preceding paragraph can optionally include additionally and/or alternatively, any one or more of the following features, configurations and/or additional components.

The improvement may be used to provide a grounding path between an outer fan case and an inner compressor case.

The improvement can be used with two surfaces formed of different metal alloys.

The different metal alloys can include at least one of an aluminum alloy and a titanium alloy.

The nonconductive coating can comprise at least one of a polyurethane and an epoxy.

The bolt receiving cavity can be sized to support the bolt head on the washer such that the bolt head is no higher than the surface of the SGV.

The invention claimed is:

1. A device for providing a grounding path between an outer surface of a gas turbine aircraft engine and an inner surface of the gas turbine aircraft engine, the device comprising:
    a structural guide vane (SGV) with a nonconductive coating on the surface thereof for attachment to the outer surface and the inner surface;
    at least one bolt hole on each end of the SGV that attaches to the outer surface and the inner surface, each of the at least one bolt hole having a bolt receiving cavity without the nonconductive coating;
    a conductive washer for insertion in the bolt receiving cavity;
    a bolt for insertion into each of the at least one bolt hole in contact with the conductive washer;
    a conductive nut for attachment to each bolt, such that attachment of the SGV to the outer surface or the inner surface provides a ground path from the SGV through each bolt, washer and nut for electrical engagement with a surface to which each bolt attaches the SGV.

2. The device of claim 1, wherein the outer surface is a fan case and the inner surface is a compressor case.

3. The device of claim 1, wherein the outer surface and the inner surface are formed of different metal alloys.

4. The device of claim 3, wherein the different metal alloys include at least one of an aluminum alloy and a titanium alloy.

5. The device of claim 1, wherein the nonconductive coating comprises at least one of a polyurethane and an epoxy.

6. The device of claim 1, wherein the bolt receiving cavity of each of the at least one bolt hole is sized to support the bolt head of each bolt on the washer so the top of the bolt head is at a point no higher than the coated surface of the SGV.

7. A method for grounding an outer surface of a gas turbine aircraft engine to a grounded inner surface of a gas turbine aircraft engine, the method comprising:

providing a structural guide vane (SGV) with a nonconductive coating on the surface thereof for attachment to the outer surface and the inner surface;

making at least one bolt hole on each end of the SGV that attaches to the outer surface and the inner surface, each of the at least one bolt hole having a bolt receiving cavity without the nonconductive coating;

inserting a conductive washer in the bolt receiving cavity;

placing a bolt into each of the at least one bolt hole in contact with the conductive washer; and attaching a conductive nut on each bolt, such that attachment of the SGV to the outer surface or the inner surface provides a ground path from the SGV through each bolt, washer and nut for electrical engagement with a surface to which each bolt attaches the SGV.

8. The method of claim 7, wherein the outer surface is a fan case and the inner surface is a compressor case.

9. The method of claim 7, wherein the outer surface and the inner surface are formed of different metal alloys.

10. The method of claim 9, wherein the different metal alloys include at least one of an aluminum alloy and a titanium alloy.

11. The method of claim 7, wherein the nonconductive coating comprises at least one of a polyurethane and an epoxy.

12. The method of claim 7, wherein the bolt receiving cavity of each of the at least one bolt hole is sized to support the bolt head of each bolt on the washer so the top of the bolt head is at a point no higher than the coated surface of the SGV.

13. In a gas turbine aircraft engine having an outer surface of the gas turbine aircraft engine and a grounded inner surface of the gas turbine aircraft engine that are connected by a plurality of structural guide vanes (SGV), the improvement comprising:

forming at least one SGV with a nonconductive coating on the surface thereof for attachment to the outer surface and the inner surface;

providing at least one bolt hole on each end of the SGV such that each of the at least one bolt hole has a bolt receiving cavity without the nonconductive coating;

providing a conductive washer for insertion into the bolt receiving cavity;

a conductive washer is then inserted into the bolt receiving cavity;

a bolt is provided for insertion into each of the at least one bolt hole in contact with the conductive washer; and a conductive nut is provided for attachment to each bolt, such that attachment of the SGV to the outer surface or the inner surface provides a ground path from the SGV through each bolt, washer and nut for electrical engagement with a surface to which each bolt attaches the SGV.

14. The improvement of claim 13, wherein the outer surface is a fan case and the inner surface is a compressor case.

15. The improvement of claim 13, wherein the outer surface and the inner surface are formed of different metal alloys.

16. The improvement of claim 15, wherein the different metal alloys include at least one of an aluminum alloy and a titanium alloy.

17. The improvement of claim 13, wherein the nonconductive coating comprises at least one of a polyurethane and an epoxy.

18. The improvement of claim 13, wherein the bolt receiving cavity of each of the at least one bolt hole is sized to support the bolt head of each bolt on the washer so the top of the bolt head is at a point no higher than the coated surface of the SGV.

* * * * *